ies Patent [19]

United States Patent [19]

De Fauw

[11] 4,024,778
[45] May 24, 1977

[54] RETRACTABLE TOOL HOLDER
[76] Inventor: James R. De Fauw, 911 Wadsworth, Pontiac, Mich. 48053
[22] Filed: Oct. 6, 1975
[21] Appl. No.: 619,650
[52] U.S. Cl. .................................. 82/36 R; 408/147
[51] Int. Cl.² ................... B23B 29/00; B23B 51/00
[58] Field of Search ............... 82/36 R, 36 A, 34 R; 408/224, 179, 146, 147, 116, 153, 158, 150; 90/11 F, DIG. 12

[56] References Cited
UNITED STATES PATENTS

| | | | |
|---|---|---|---|
| 3,254,548 | 6/1966 | Gersch | 408/150 |
| 3,320,831 | 5/1967 | Bullard | 408/147 |
| 3,422,705 | 1/1969 | Nahodil et al. | 408/147 |
| 3,526,159 | 9/1970 | Robinson et al. | 408/147 |

*Primary Examiner*—Harrison L. Hinson
*Attorney, Agent, or Firm*—Dale Austin Winnie

[57] ABSTRACT

A holder for a retractable cutting tool holder and which includes a housing having a bore within which is provided the retractable tool holder with its operative end extending therebeyond, a piston member in the bore operatively engaged with the retractable holder, adjustable means for setting the stroke of the piston and thereby the cutting depth of the work tool, and air pressure passageways in communication with opposite sides of said piston for selectively advancing and providing support for the work tool and subsequently simultaneously removing said support and retracting said tool without leaving tool witness marks on a work piece.

1 Claim, 3 Drawing Figures

RETRACTABLE TOOL HOLDER

BACKGROUND OF THE INVENTION

Retractable cutting tool holders are generally known for use with boring machines and turret latches, which have the work piece rotated relative to the work tool, and wherein a compression spring in the holder is used to retract the actual cutting element just before the tool is withdrawn from the work piece.

In this regard, general reference is made to the BOKUMATIC tool, model K, made by the Bokum Tool Company of Madison Heights, Mich., which will be more fully described in the discussion of the present invention which follows hereinafter.

One noticeable problem with such retractable tool holders is that the compression spring does not allow as quick and rapid a retraction as is desirable since the means for positively positioning the cutting tool and providing back-up support must be retracted or withdrawn before the retracting spring is effective. Consequently, tool witness mark such as spiraling or rifling frequently occur and although this can be avoided by shutting down the machine, before the cutting tool is retracted and withdrawn, the down time is obviously undersirable.

What is needed is a means for actuating and setting the cutting tool for a precision cut, providing the necessary support for the work to be done by the cutting tool, and subsequent being able to simultaneously remove the tool support and retract the tool to avoid leaving any tool witness marks.

SUMMARY OF THE PRESENT INVENTION

The present invention relates to a holder and actuating means for a retractable cutting tool holder.

The holder of this invention includes a cylindrical housing capable of being held and retained within a work tool chucking device, which in turn is capable of advancing and retracting a cutting tool relative to a work piece to perform its intended function.

The cylindrical housing is provided with a bore that is restricted at one end and open at the other in order to receive the retractable cutting tool holder therewithin and to have it protrude through the restricted end. It also has a piston member provided within the bore which is adapted to be positively engaged to the actuating end of the cutting tool holder next adjacent thereto in the bore.

The piston includes a rod that extends through a closure over the open end of the cylindrical housing and which is threaded for a micrometer dial received on the external end thereof. The micrometer dial arrangement is used to set the travel limit for the piston in the bore which, in turn, determines the cut to be made by the cutting tool carried by the cutting tool holder.

The actuating means for the present holder includes air pressure passageways in communication with the bore in the cylindrical housing, on opposite sides of the piston member, to alternately advance the cutting tool for the work to be performed and subsequently retract the cutting tool at the same time the tool support is removed to avoid leaving tool witness marks as the cutting tool is withdrawn from a work piece.

DESCRIPTION OF THE DRAWING FIGURES

Figure 1:
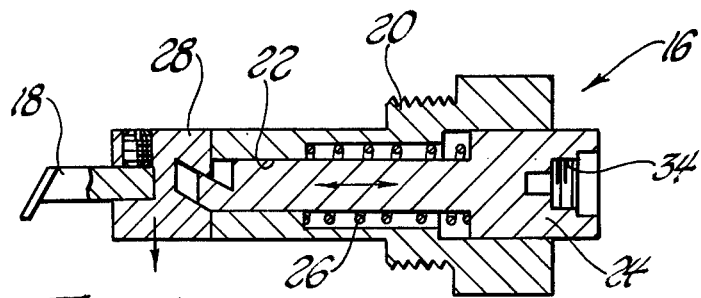
FIG. 1 is a cross sectional view of a retractable cutting tool holder of the type for use in combination with the particular holder of the present invention.

DESCRIPTION OF THE ILLUSTRATED EMBODIMENT:

The cutting tool holder 10 of the present invention is shown in the second drawing figure as including a cylindrical housing 12 of a general size suitable for being held and retained within the chucking device of a cutting tool machine, such as a boring machine or a turret lathe, where the work is rotated relative to the work tool.

The housing member 12 is formed to include a cylindrical bore 14 within which is received a retractable cutting tool holder 16, of the type shown in the first drawing figure, with the end that holds the cutting tool 18 projecting therethrough and beyond.

The retractable cutting tool holder 16 is of the BOKUMATIC model K type made by Bokum Tool Company in Madison Heights, Mich., as is shown as itself including a body or housing part 20 having a bore 22 within which is disposed an actuating bar 24 biased in a retract position by a compression spring 26 and which is adapted to cause lateral movement of a head 28 within which is received and retained the cutting tool 18.

The Bokum tool is shown only as to those functional features which pertain and help in the understanding of the present invention and is not intended as a full disclosure or description thereof nor as any limitation upon the present invention as to use only therewith. Other retractable tool holders which include a reciprocal actuating bar or like means to obtain lateral or radially offset movement of a cutting tool may also be accomodated by the holder of the present invention, as adapted for use therewith.

Referring back again to FIG. 2, one end of the bore 14 is restricted to provide a shoulder stop flange 30 and a threaded opening 32 is provided to receive and retain the supported end of the housing on body part 20 of the retractable cutting toolholder.

The end of the actuating bar 24 which is disposed within holder bore 14 is formed for close fitted piloted and threaded engagement, as at 34, with means for actuating the bar against the resistance of its compression spring 26. In the present instance such means include a piston member 36 fitted to the bore 14 and having an end projection 38 formed and threaded for the piloted and threaded engagement mentioned.

The piston number 36 is formed to include a piston rod 40 on the other side thereof which extends through the open end of the bore 14 and through an end wall closure or cap 42 that is fastened to the housing member 12, as by threaded bolt fastener 44.

An annular groove and sealing ring 46 is provided around the piston 36, and is similarly formed and provided around the piston rod, as at 48, where it passes through the end closure wall, to provide relative air tightness for the chamber spaces 50 and 52 that occur in the bore on each side of the piston member as a consequence of the relative location of the piston member within the bore with respect to the closures at opposite ends thereof.

An air pressure passageway 54 is provided through the external wall of the housing 12 for communication with the one chamber space 50 and a like passageway 56 is similarly provided for communication with the other chamber space 52. Both passageways are threaded for connection to an air pressure supply source and as alternately charged and exhausted, or vented, will be appreciated as serving to actuate the piston member 36 within the bore, in one direction or the other, and to actuate or retract in turn the cutting tool 18 remotely located and held in the end of the retractable cutting tool holder.

For fine and precise control over the extent of the cut to be allowed the cutting tool 18, a micrometer dial 58 with micrometer thread engagement is provided on the extended end of the piston rod 40. The knob end 60 of the dial is provided with a set screw arrangement 62 to fix selected settings of the dial relative to the rod and shoulder abutments are provided as at 64 for end wall engagement limiting the extent of rod and piston movement in the actuation and consequently the setting of the work tool.

In operation and use, with the holder 12 assembled as described and with the retractable cutting tool holder extending through the one end, air pressure introduced into the chamber space 52 will set the cutting tool for the work to be done as limited by the shoulder abutment engagement as set in turn by the micrometer dial on the end of the piston rod 40. To retract the cutting tool, when the work is done, the chamber space 50 is charged and the space 52 exhausted or vented to immediately withdraw the tool support and simultaneously force the piston back towards its opposite end wall limit.

Figure 2:
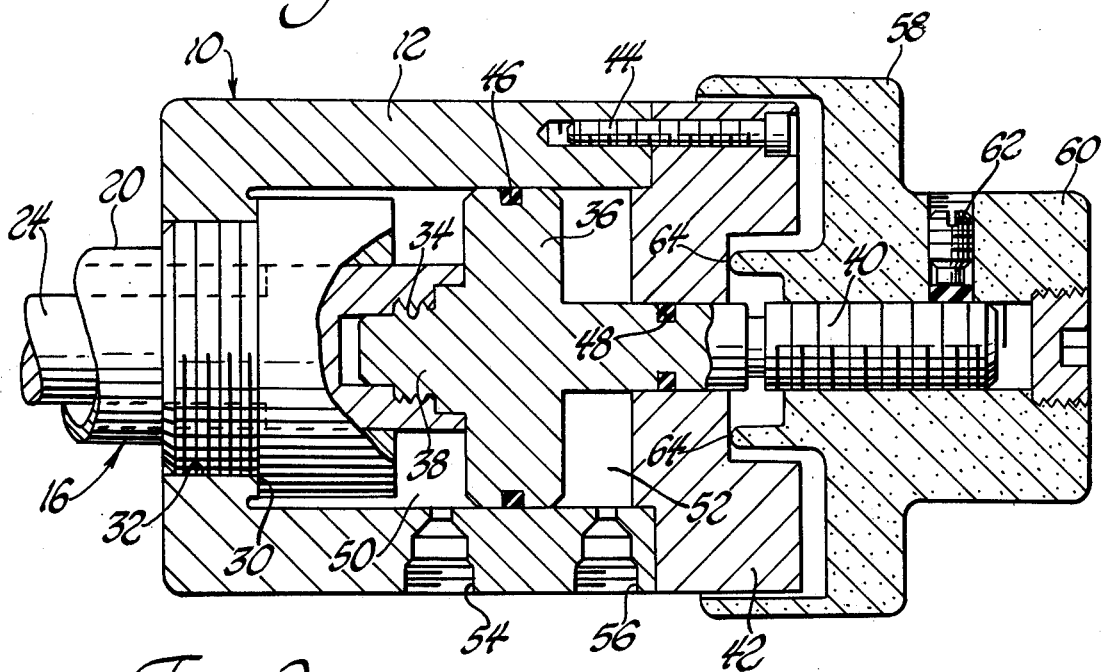
FIG. 2 is a cross sectional view of the holder of the present invention showing the retractable cutting tool holder of FIG. 1 in use therewith.
Figure 3:
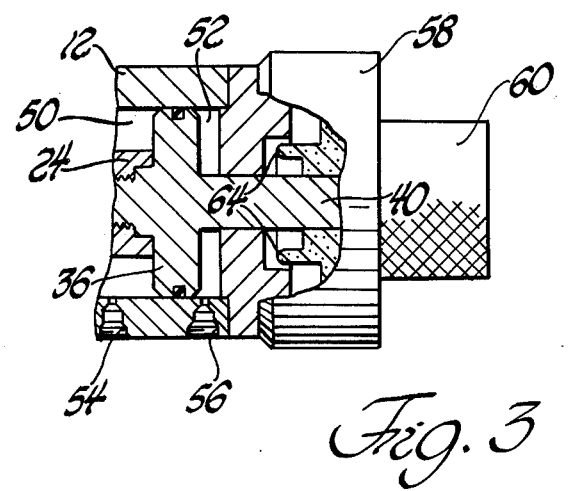
FIG. 3 is a partial cross sectional view of the holder of FIG. 2, reduced in size, showing the operative mechanism in a different functional position.

FIG. 2 shows the tool positioning location of the piston member, rod and setting dial while FIG. 3 shows the arrangement when the tool is in its retract position.

Although the BOKUMATIC tool shown and described includes a compression spring for tool retraction, it will be appreciated that it is the air pressure actuation of the piston member, together with the exhaust or venting of of the other chamber space, to remove tool support, which effects the rapid and instantaneous retraction that occurs and that a retractable cutting tool holder without such a spring load would work equally as well.

It should also be noted however in passing that with a spring loaded retract tool holder, such as the BOKUMATIC, air pressure introduced into the chamber space 52, can be used to advance the tool and provide cutting support against the bias of the retract spring, while the chamber space 50 is simply vented, and that upon the exhaust or venting of the space 52, which immediately removes the tool support, the spring force can effect a good and satisfactory retract without leaving any tool witness marks.

One further note as regards the present disclosure, in use with a BOKUMATIC tool holder there is an end stop position in the retract which spaces the piston face from the end closure wall and does not close off the pressurizing passageway 56. In use with other retract tools an end wall bumper or other means known in the art should be used to preclude passageway closure by such end wall abutment.

I claim:

1. A cutting tool holder for use with cutting tool machines having the work piece rotated relative to the working tool, and comprising; a housing suitable for being held and retained within a work tool chucking device and having a bore provided therewithin which is receptive of a retractable tool holder protruding through one end thereof and supported therewithin, a piston member received in said bore and having means of actuating engagement with said retractable tool holder and a piston rod extending through the opposite end of said bore, an end wall closure on said housing for closing said bore and having said piston rod extended therethrough, micrometer adjustment means provided on the end of said piston rod for relatively setting said piston member in said bore, air pressure passage means provided through the external wall of said housing and in communication with said bore for pressurized actuation of said piston to set said cutting tool and to selectively provide and remove tool support therefore, and means operative on the other side of said piston member for actuation thereof in the opposite direction immediately upon and simultaneous with the removal of tool support therefrom, said housing member having air pressure passage means in communication with said bore on the other side of said piston member and serving at least partially as said last mentioned operative means, said housing member having one end of said bore restricted to provide a shoulder stop flange and which is threaded for retaining engagement with said retractable tool holder, and said piston member having like means of shoulder stop and threaded engagement with said retractable tool holder for secure engagement thereto, and said micrometer adjustment means including a dial member in threaded engagement with said piston rod and having abutment engagement with said end closure wall in the setting of said piston member in said bore and the work cut of a cutting tool carried by said retractable tool holder.

* * * * *